April 13, 1965     N. LAING     3,178,131

AIRCRAFT WING STRUCTURE

Filed Oct. 3, 1963     13 Sheets-Sheet 1

INVENTOR
Nikolaus Laing
ATTORNEYS

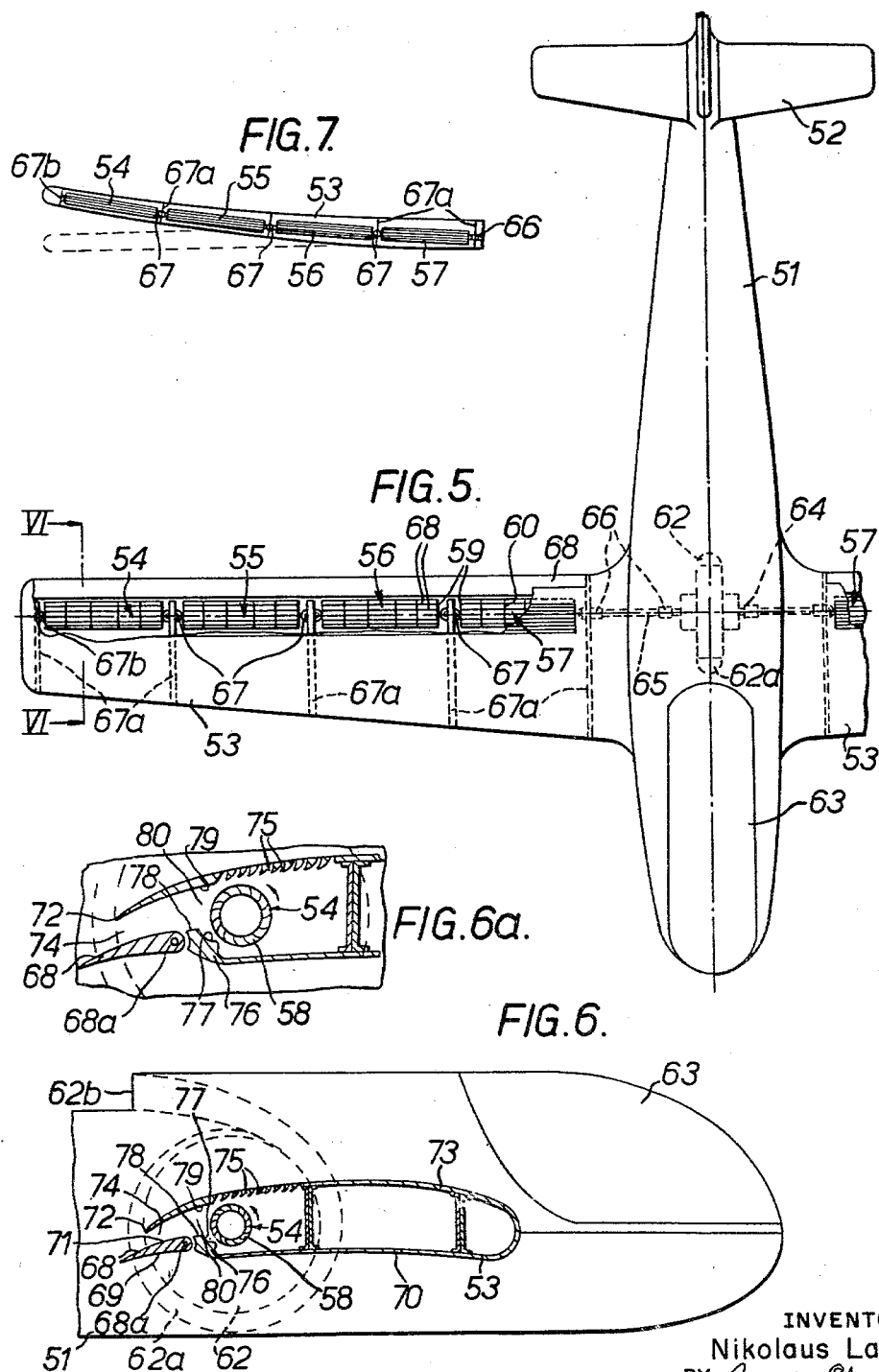

April 13, 1965   N. LAING   3,178,131
AIRCRAFT WING STRUCTURE
Filed Oct. 3, 1963   13 Sheets-Sheet 4
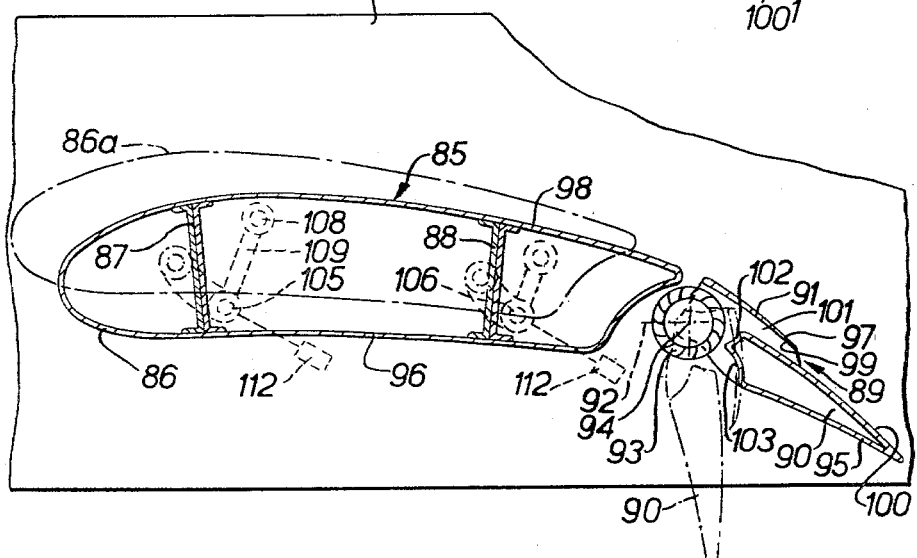
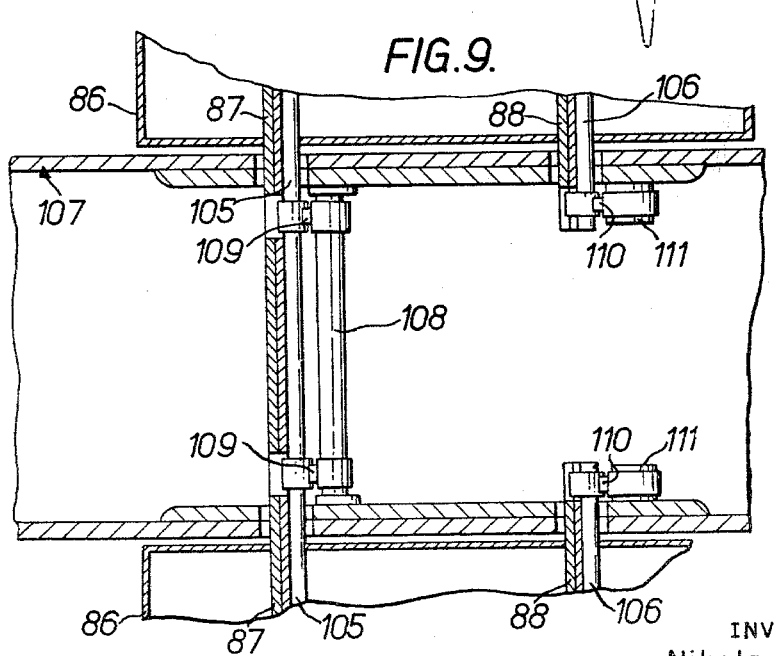
INVENTOR
Nikolaus Laing
BY
ATTORNEYS INVENTOR
Nikolaus Laing
ATTORNEYS

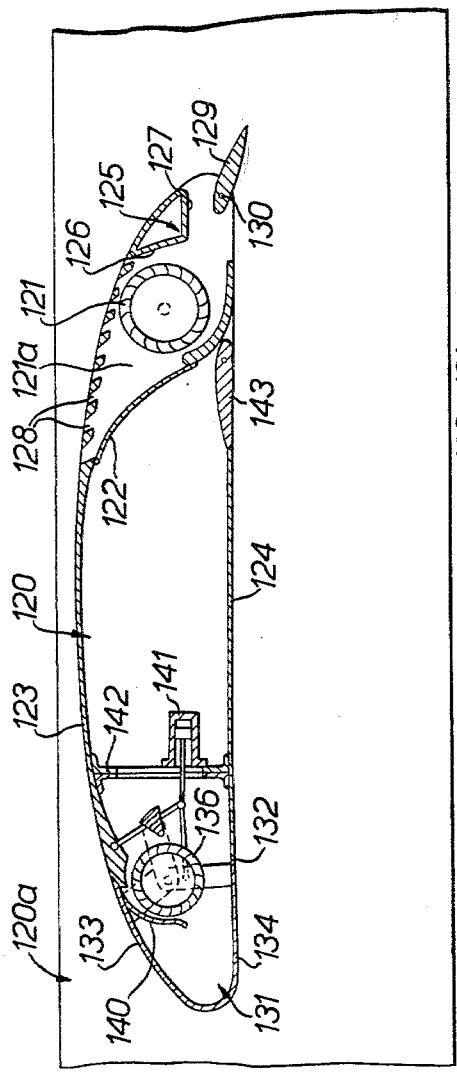
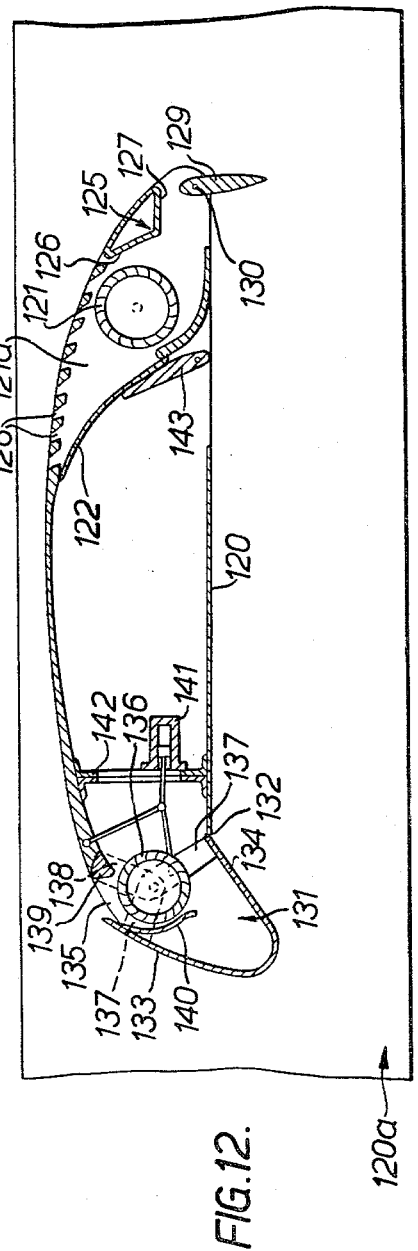
FIG. 11.
FIG. 12.

April 13, 1965 N. LAING 3,178,131
AIRCRAFT WING STRUCTURE
Filed Oct. 3, 1963 13 Sheets-Sheet 7

INVENTOR
Nikolaus Laing
BY
ATTORNEYS

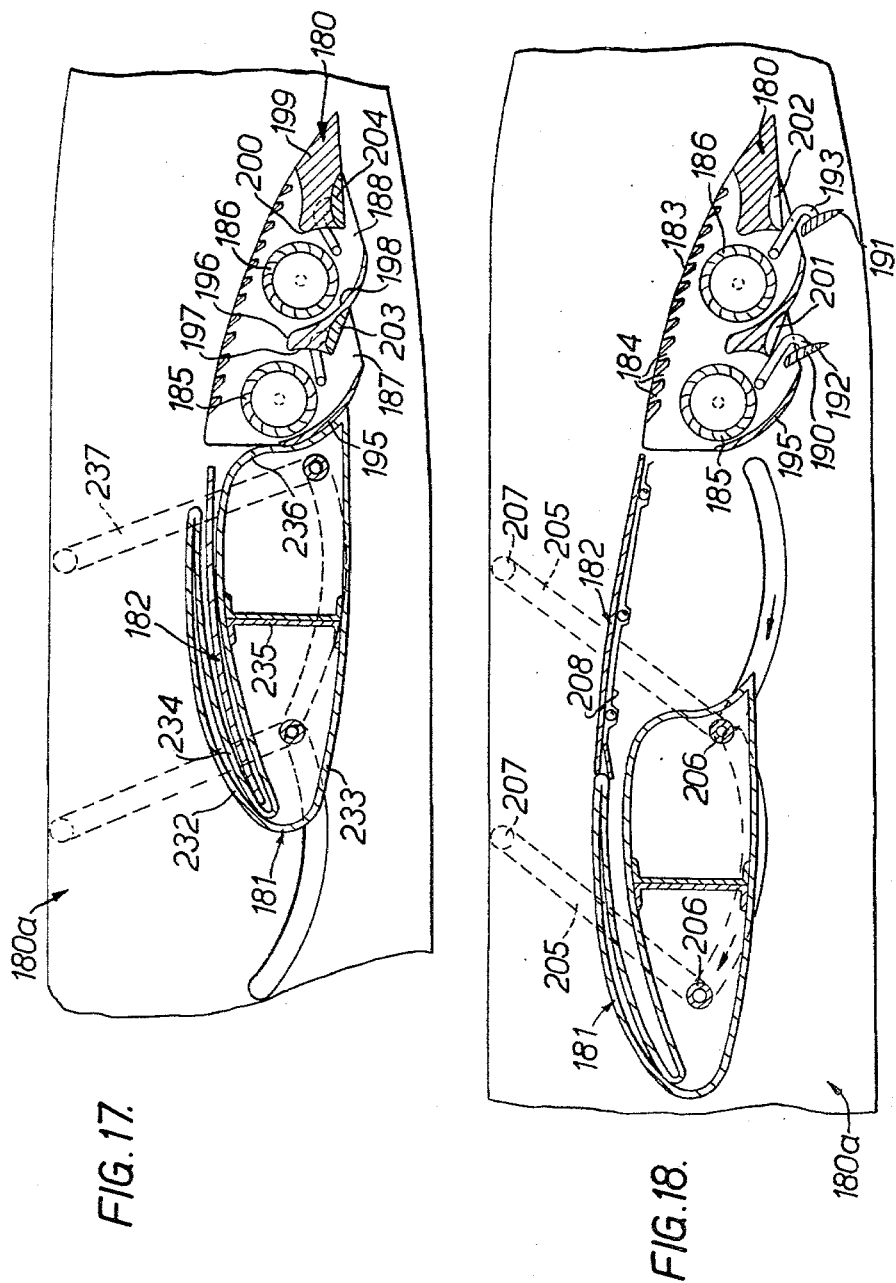

INVENTOR
Nikolaus Laing
BY
ATTORNEYS

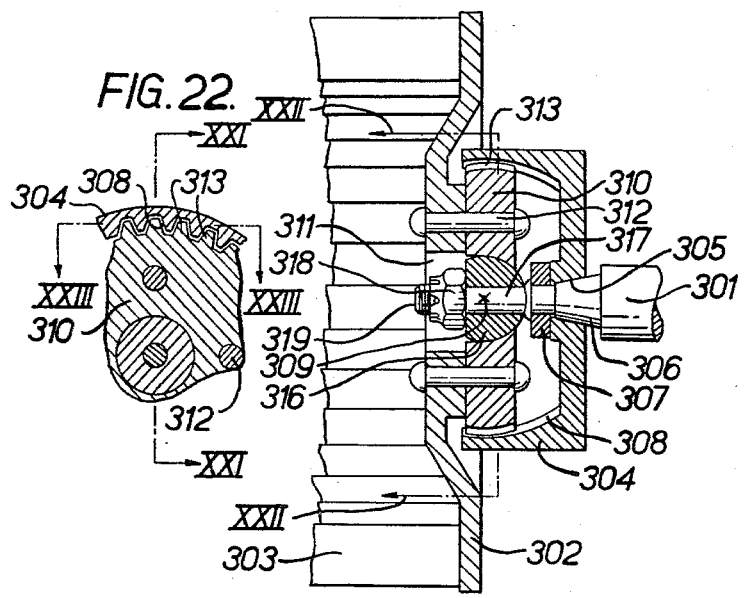
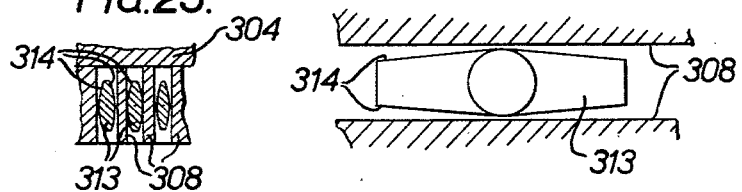

April 13, 1965  N. LAING  3,178,131
AIRCRAFT WING STRUCTURE
Filed Oct. 3, 1963  13 Sheets-Sheet 13

INVENTOR
Nikolaus Laing
BY
ATTORNEYS

United States Patent Office 3,178,131
Patented Apr. 13, 1965

3,178,131
AIRCRAFT WING STRUCTURE
Nikolaus Laing, Hofener Weg 35–37 7141 Aldingen, near Stuttgart, Germany
Filed Oct. 3, 1963, Ser. No. 313,578
11 Claims. (Cl. 244—15)

This invention relates to aircraft, and more particularly to wing structures therefor. This application is a continuation-in-part of pending application Serial No. 148,179, filed October 27, 1961, itself a continuation-in-part of pending application Serial No. 701,643, filed December 9, 1957.

The invention provides basically a wing structure having a main wing portion and a movable flap portion mounted on a rear part of said main wing portion, a cylindrical bladed rotor clear of interior guides rotatably mounted in the wing structure with its axis extending longitudinally thereof over the length of said main wing portion and said flap portion, guide means extending the length of said rotor and outside it and co-operating on rotation of the rotor to induce a flow of air transversely to the rotor axis through the path of the rotating blades into the interior of the rotor and thence again through the path of the rotating blades, the wing structure defining a slot-like discharge opening extending the length of said rotor whereby the throughput thereof is discharged over a surface of said flap portion.

The blower constituted by the rotor and guide means above defined is capable of moving large volumes of air at high velocity but relatively low static pressure. An essential feature of the invention is that the blower should discharge more or less directly through the discharge opening, with negligible deflection of flow in the direction of the rotor axis, and with the minimum deflection in planes transverse to that axis, at least before reaching the guide surface. In this way energy is imparted to the blower throughput mainly in the form of kinetic energy and this kinetic energy is thereafter immediately made use of in the control and/or propulsion of the aircraft, rather than being dissipated in ducting.

The cross-flow blower, that is, the combination of a cylindrical bladed rotor with guide means co-operating therewith on rotor rotation to induce a flow of air transversely to the rotor, has been the subject of occasional patents (e.g. the Dalin British Patent No. 291,007) going back to the work of Mortier at the end of the last century (see United States Patent No. 507,445) though not all these patents disclose rotors which are clear of interior guides and have their guide means outside the rotor. I have found that a cross-flow blower without interior guides and with solely external guide means can be made to produce a large throughput volume at high velocity and relatively low pressure, and, as above indicated, I have found a way of making effective use of this throughput.

The invention contemplates that the rotor, guide means therefor, flap portion and discharge opening should extend over a considerable length of the wing structure. With this aim in view, the invention provides, in the wing structure above defined, that the guide means should be well spaced from the rotor (i.e. by at least one third and preferably over one half of the radial blade depth), and should be such as to set up in operation a Rankine vortex which guides the throughput along strongly curved paths. This spacing of the guide means, which runs counter to the general teaching of the prior patents above referred to, renders the blower not only more efficient but also less liable to derangement due to wing flexure, vibration or the like, such as could have disastrous results.

Drive for the rotor may be provided in any convenient manner, but it will commonly be preferred to have a centrally located drive means in the fuselage driving the rotors of opposite wing structures. With such an arrangement the invention provides for the rotors in each wing structure to be sub-divided into sections, each section supported at either end on transverse bulkheads in the wing, and, going along the wing towards its tip, each section driving the next in order: for this purpose the rotors are interconnected by joint structures which transmit drive between the rotors with accommodation of limited universal movement, and which are mounted in the corresponding bulkheads also with accommodation of such movement. Thus the rotor is driven and supported such that blower operation is independent of wing flexure.

The wing structure according to the invention can be used as a control means for the aircraft, when it operates as a normal wing, but with a flap-controlled jet flap. In this case the propulsion effect of the blower throughput, when rearwardly directed, may be small. However, the invention proposes alternatively that the blower throughput should be utilized to provide the whole or a substantial part of the forward thrust on the aircraft. In this case, the wing structure can combine propulsion and control functions.

In a preferred form of the wing structure according to the invention the flap portion is adjustable to direct the blower throughput, or a major part of it, in a downward direction so as to produce a substantial lift component. Since this lift component will act at or near the trailing edge of the wing, the invention provides simultaneously for adjusting the lift on the forward part of the wing to keep the centre of pressure on the wing structure as a whole at or about its normal flight position. This may be done by pivoting downwardly a leading edge portion and blowing air over the upper surface of the wing, or by extending the wing forwardly. This form of wing structure may advantageously be employed in short take-off and land aircraft.

A preferred construction includes two rotors in each wing driven separately by two separate engines in the fuselage: thus failure of one engine still leaves a symmetrical propulsion system operating.

Various embodiments of the invention will now be described by way of example with reference to the accompanying more or less diagrammatic drawings, in which:

FIGURE 5 is a plan view of an aircraft having a wing structure according to the invention, parts being shown cut away;

FIGURE 6 is a sectional side elevation of the FIGURE 5 aircraft, the section being taken transversely of the wing on the plane indicated at VI—VI in FIGURE 5;

FIGURE 6a is an enlargement of a portion of FIGURE 6;

FIGURE 7 is a schematic section taken longitudinally of one wing of the aircraft;

FIGURE 8 is a sectional side elevation of a further form of aircraft with parts cut away, the section again being taken transversely of the wing;

FIGURE 8a shows a modification which can be incorporated in the FIGURE 8 structure;

FIGURE 9 is a sectional plan view of a portion of the fuselage and wings of the FIGURE 8 aircraft;

FIGURES 11 and 12 are sectional side elevations of an aircraft illustrating two conditions of the aircraft wing structure, the section being taken on a vertical plane transverse to the wing;

Figure 10A:
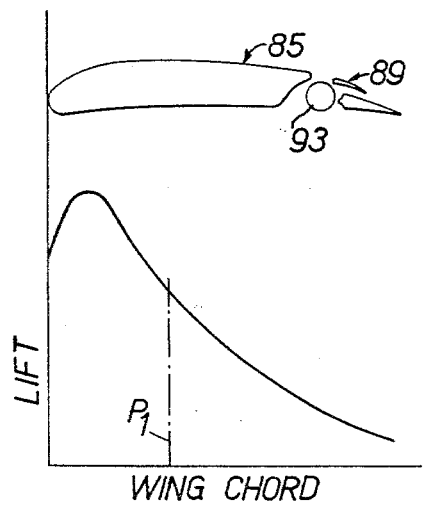
FIGURES 10a and 10b are pressure diagrams illustrating the lift on the wing shown in FIGURES 8 and 9 in its two positions, respectively, pressures being indicated as ordinates and the wing chord forming the abscissae—above each diagram is shown the corresponding wing profile.
Figure 13A:
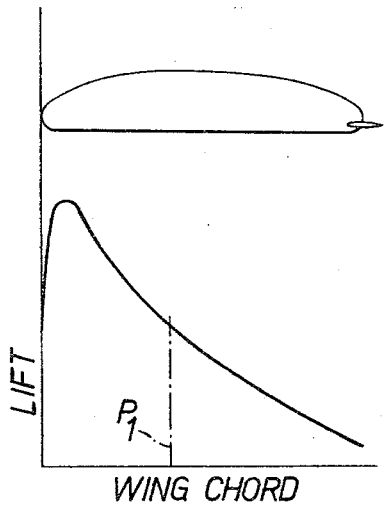
Figure 10B:
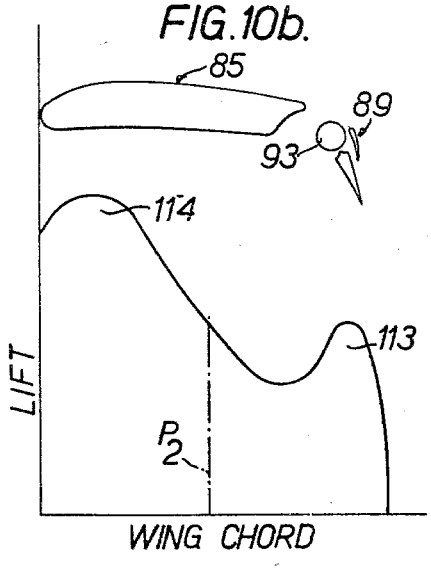
Figure 13B:
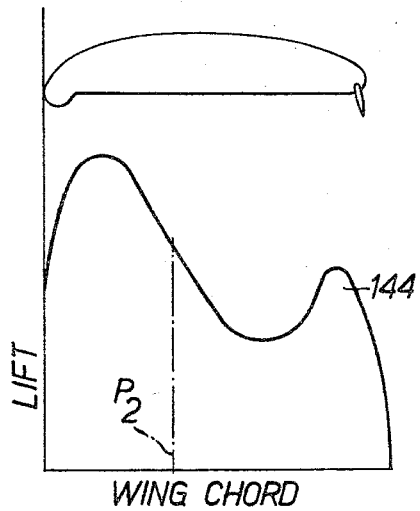
Figure 14:
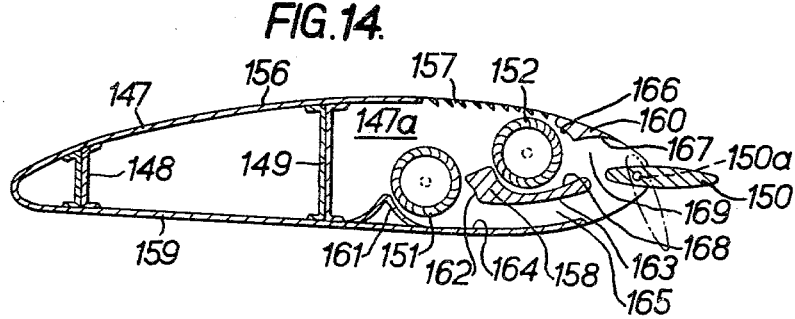
Figure 15:
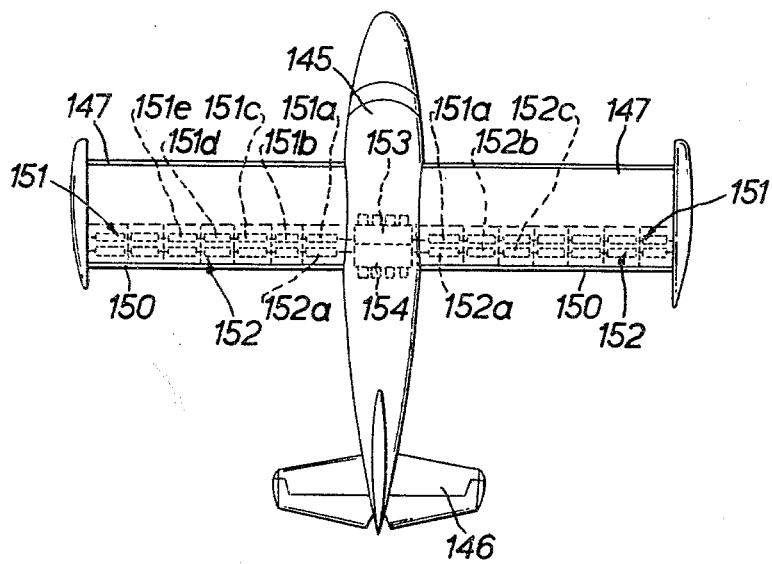
Figure 16:
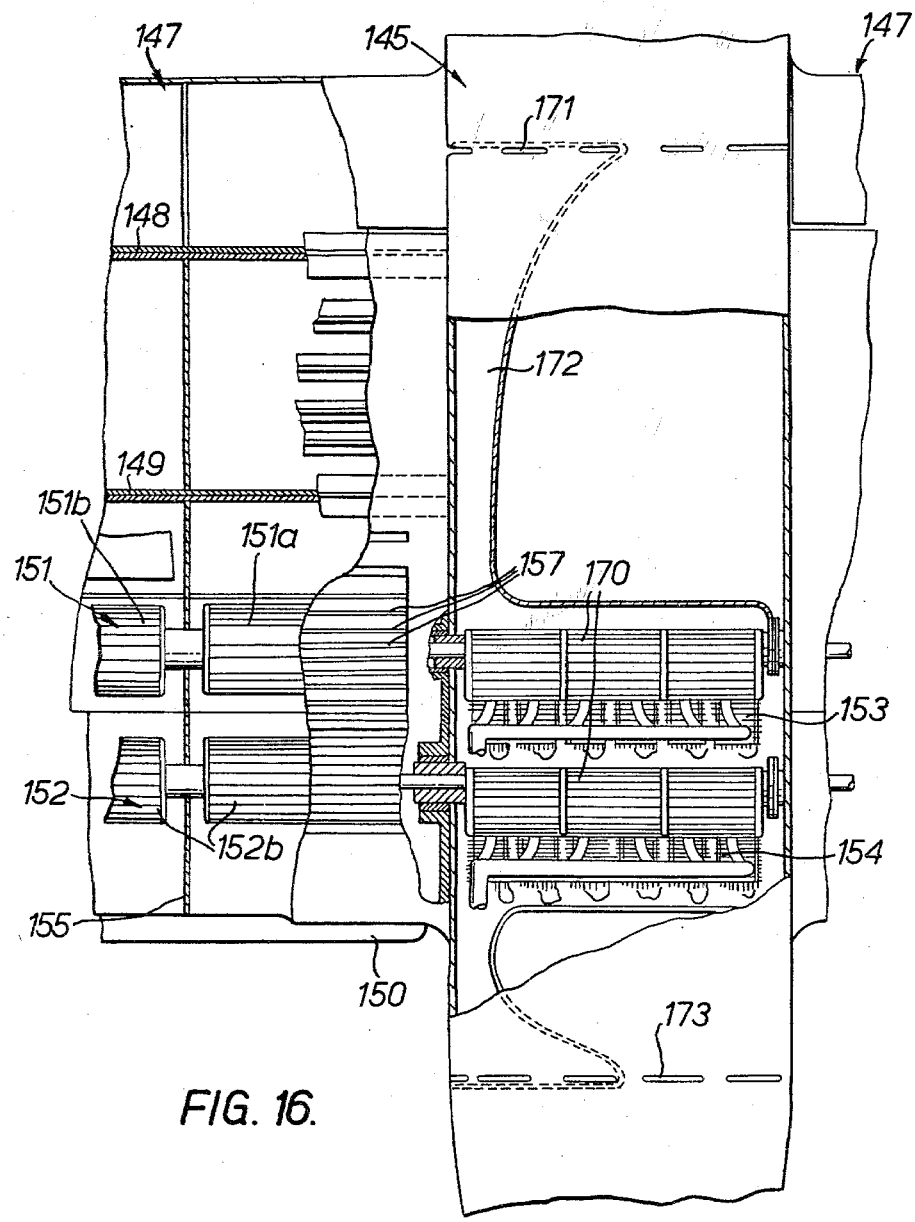
Figure 19A:
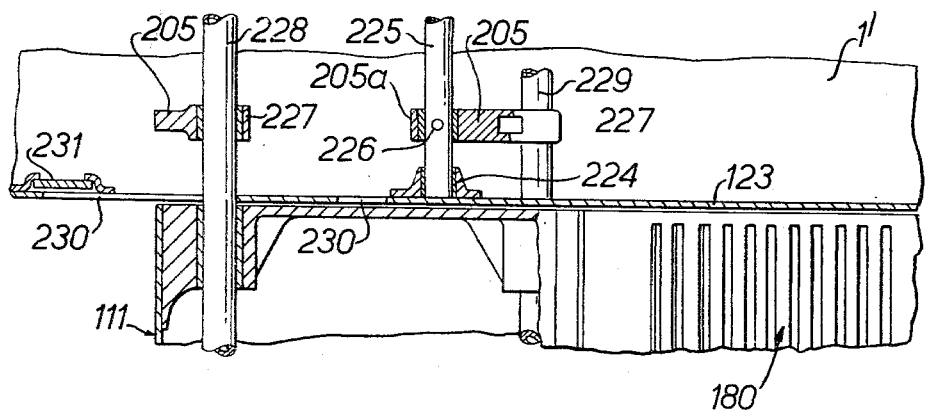
Figure 19B:
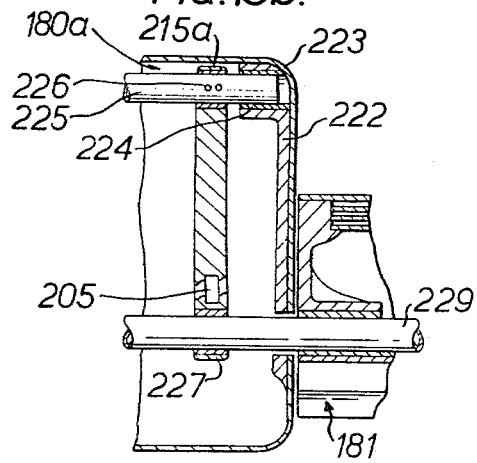
Figure 20A:
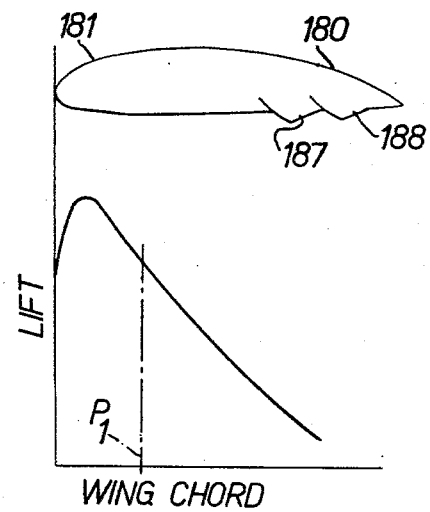
Figure 20B:
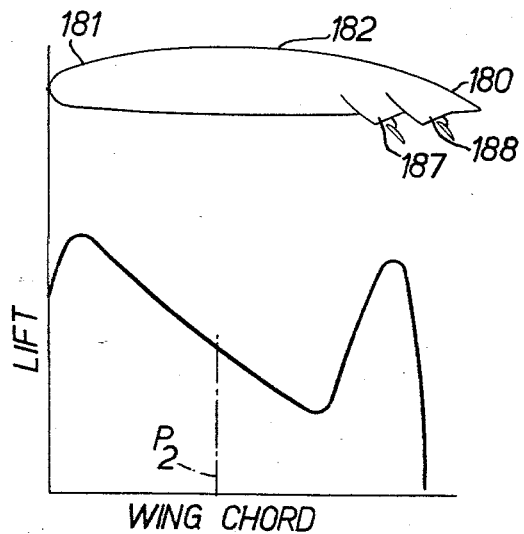
Figure 25:
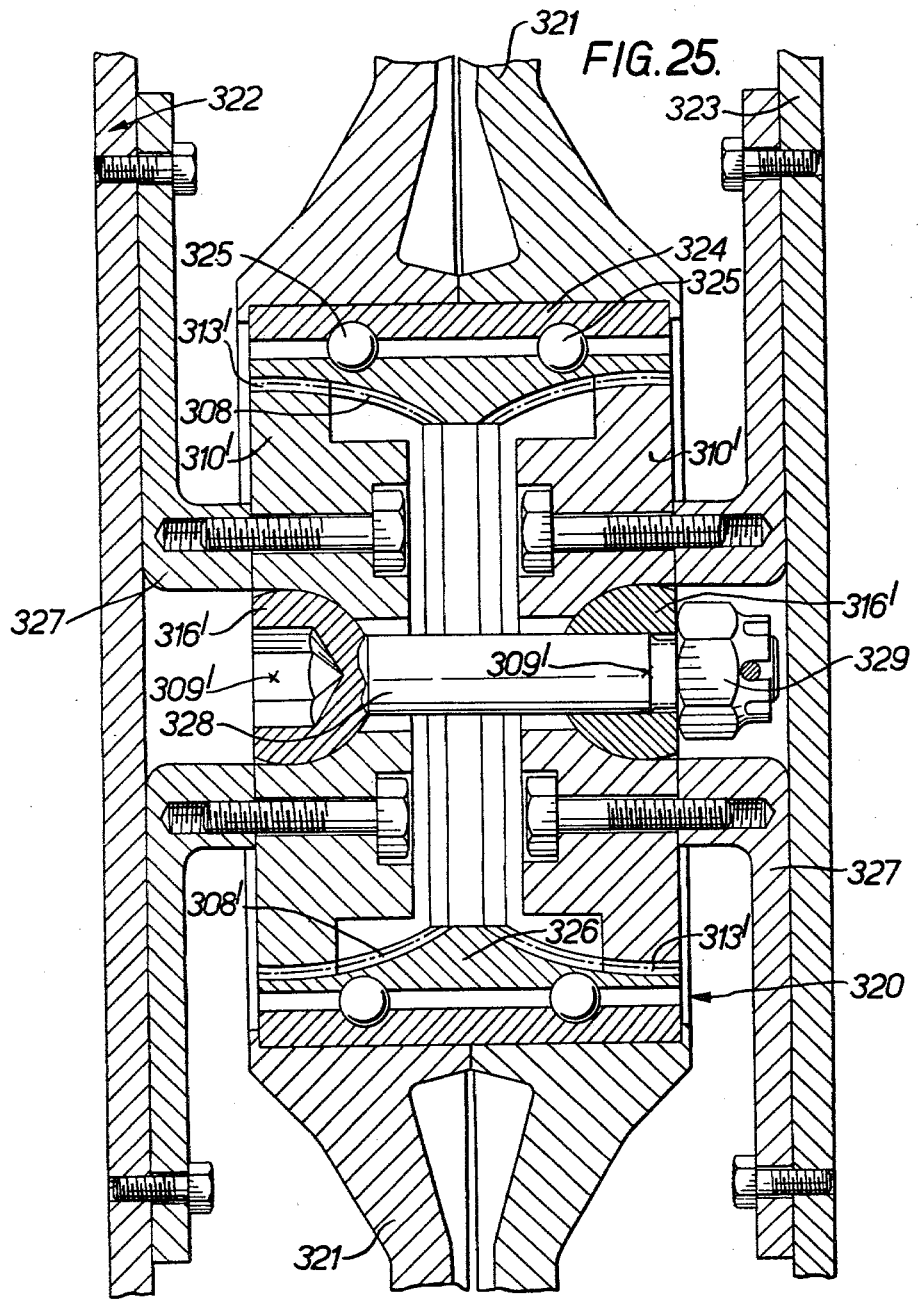

FIGURES 13a and 13b are pressure diagrams corresponding to FIGURES 10a and 10b, but illustrating the lift on the wing structure of FIGURES 11 and 12;

FIGURE 14 is a vertical transverse section of a further form of wing structure;

FIGURE 15 is a plan view of an aircraft incorporating the wing structure of FIGURE 14;

FIGURE 16 is a sectional plan view, with parts cut away, of the central part of the aircraft shown in FIGURE 15;

FIGURES 17 and 18 are sectional side elevations showing a joined wing structure in two conditions thereof;

FIGURES 19a and 19b are respectively a partial sectional plan and a partial vertical transverse section showing the support on the aircraft fuselage of a leading wing member forming part of the structure illustrated in FIGURES 17 and 18;

FIGURES 20a and 20b are pressure diagrams corresponding to FIGURES 10a and 10b and illustrating the lift on the wing structure of FIGURES 17 and 18 in the two conditions thereof;

FIGURE 21 is a partial axial section showing a drive connection to one end of the rotor;

FIGURE 22 is a partial transverse section of the structure shown in FIGURE 21, taken on the plane indicated at XXII—XXII in FIGURE 21—the section plan of FIGURE 21 is shown at XXII—XXII on FIGURE 22;

FIGURE 23 is a scrap section taken on the plane indicated at XXIII—XXIII in FIGURE 22;

FIGURE 24 is an enlarged view of a tooth as illustrated in FIGURE 23;

FIGURE 25 is an axial section illustrating a universal joint structure interconnecting a pair of adjacent rotor sections and deriving a support from a bulkhead shown only in part.

In what follows there will first be described a preferred form of blower: various aircraft having wing structures incorporating this blower will then be described. In this way it will not be necessary to interrupt the description of the wing structures to go into detail over the blower.

Figure 1:
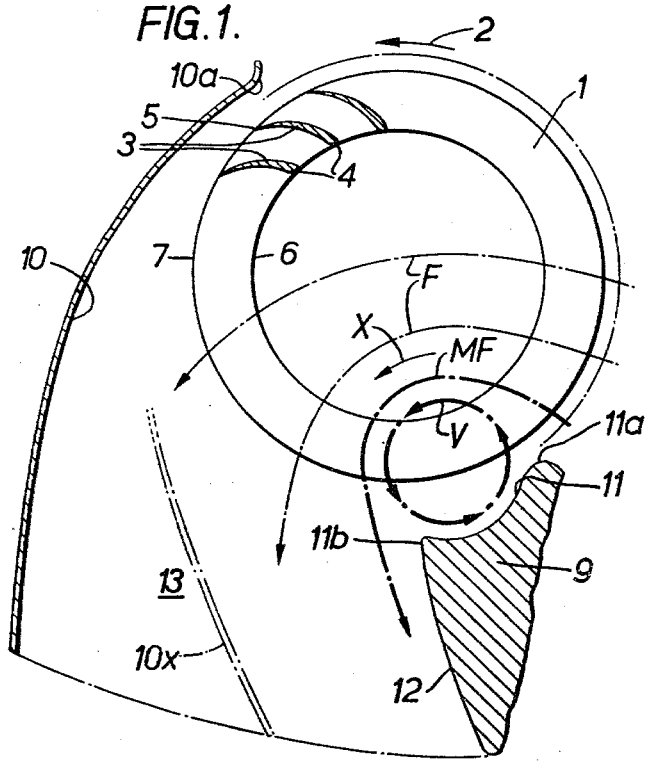
FIGURE 1 is a cross section of a blower for use in an aircraft according to the invention.

Referring now to the drawings, the blower diagrammatically shown in FIGURE 1 comprises a drum-shaped rotor designated generally 1 having its interior clear of obstruction, which rotor is mounted, by means not shown, for rotation about the axis of the drum and driven at a predetermined speed in the direction of the arrow 2, also by means not shown. The rotor 1 is provided with blades 3 extending longitudinally and having inner and outer edges 4, 5, lying on inner and outer cylindrical envelopes indicated at 6, 7. The blades are concave facing in the direction of rotation, and have their outer edges leading their inner edges. The blades 3 are of airfoil shape, with their inner edges 4 forming the "thick" portion of the airfoil.

Guides means are provided adjacent the rotor 1 and comprise a guide body 9 and a guide wall 10 both extending the length of the rotor and defining a suction region S and a pressure region P. The body 9 provides a main guide wall portion 11 which converges with the rotor 1 in the direction of rotor rotation down to a line 11a of nearest approach to the rotor which lies spaced therefrom by more than one third of the blade depth measured radially. The wall portion 11 is concave to the rotor and extends over only a very small arc thereof (in fact it subtends at the axis of the rotor an arc of less than 20°).

The guide body 9 provides also an outlet wall portion 12 which fairs into the main guide wall portion 11 and which defines therewith an angle of approximately 90°: where they meet the wall portions 11 and 12 define a more or less rounded nose 11b.

The guide wall 10 diverges steadily from the rotor 1 with increasing radius of curvature, going from a line of nearest approach to the rotor 10a which lies approximately diametrically opposite the line 11a of nearest approach of the guide wall portion 11 and which is also spaced from the rotor 1 by more than one third of the radial blade depth. The guide wall 10 defines with the outlet wall portion 12 of the body 9 a diverging outlet 13 which forms a diffuser having an arcuate median line.

The ends of the blower are closed off by walls 14.

Figure 2:
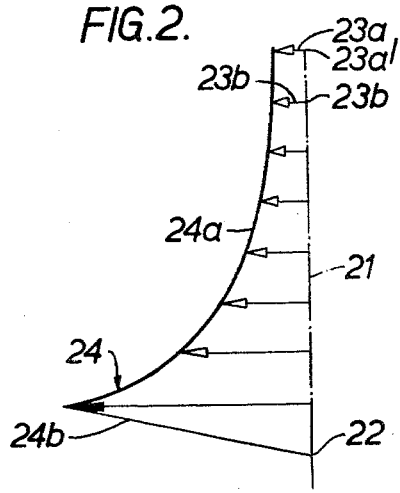
FIGURE 2 is a graph showing, as ordinates, air velocities in the blower of FIGURE 1.

In operation of the FIGURE 1 blower a Rankine vortex is set up, the core of which is eccentric to the rotor axis, and indicated by the flow lines shown chain dotted at V; the whole throughput flows from the suction region S through the path of the rotating rotor blades 3 to the interior of the rotor and thence again through the path of the rotating blades to the pressure side of the rotor; flow takes place in a direction always perpendicular to the rotor axis and as indicated in general direction only by the chain dotted flow lines F, MF. FIGURE 2 shows the distribution of velocity in the vortex. The chain dotted line 21 represents a diameter of the rotor taken through the axis 22 of the vortex core V. Velocity of fluid at points on the line 21 by reason of the vortex is indicated by the horizontal lines 23a, 23b, etc., the length of each line 23a, 23b, etc., being a measure of the velocity at the point 23a', 23b', etc., respectively, the envelope of these lines is shown by the curve 24, which has two portions, one 24a approximately a rectangular hyperbola and the other, 24b, a straight line. The curve 24a relates to the field region of the vortex and the curve 24b to the core; it will be understood that the curves are those of an ideal or "mathematical" Rankine vortex and actual flow conditions will only approximate to these curves.

The core of the vortex is a whirling mass of air with no translational movement as a whole, and velocity diminishes going from the periphery of the core to its axis 22. The core V intersects the inner blade envelope. The vortex core V is a region of low pressure, and the location of the core can be discovered by investigation of pressure distribution within the rotor. Although for convenience the vortex core V has been shown circular and has been regarded as possessing an axis, the core will usually not be truly circular.

The velocity profile of the fluid at the second entrance thereof to the rotor blades will be that of the vortex. In the ideal case of FIGURE 2 this profile will be that of the Rankine vortex there shown by curves 24a, 24b: in an actual case the profile will still have the general character of a Rankine vortex. Thus, there will be in the region of the periphery of the core V a flow tube of high velocity indicated at MF in FIGURE 1 by the heavier chain dots while the flow tubes remote from the periphery of the core will have a very much smaller velocity.

It will be appreciated that the much greater amount of air flows in the flow tubes in the region of maximum velocity. With a given construction the physical location of the flow tube MF is fairly closely defined. Therefore, in the restricted zone of the rotor blades 3 through which this flow tube MF passes, the relative velocity between blades and fluid is much higher than it would be in a flow machine which, following the principles adhered to hitherto in the art, was designed for a rectangular velocity profile and uniform loading of the blades in the zones thereof where fluid passes.

In the restricted blade zones through which the flow tube MF passes there will be much less separation and energy loss than if that tube flowed at the average velocity of throughput taken over the whole area of the zone of the blades through which fluid can pass, that is, transfer of momentum to the fluid occurs under excellent conditions. The transfer of momentum in the flow tubes travelling below the average velocity will be poorer, but a balance there is a substantial gain.

It will be seen that ideally the maximum velocity flow tube MF undergoes a change of direction of about 180° in passing through the interior of the rotor. Including the traversals of the blades the change of direction will then exceed 180°. This change in flow direction is not, of course, attended by losses such as would occur on similar change of direction in a duct. As will be understood, this change in direction of flow is something which has to be taken into account when designing an aircraft incorporating the FIGURE 1 blower.

It is particularly to be noted that the major part of the throughput (represented by the flow tube MF) passes through the path of the rotating rotor blades where they have a component of velocity in a direction opposite to the main direction of flow within the rotor, as shown by the arrow X.

Figure 3:
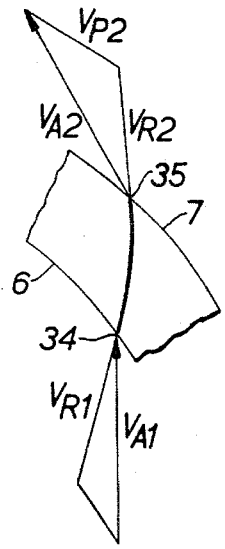
FIGURE 3 is a vector diagram showing air velocity at the inner and outer edges of a blade in the FIGURE 1 blower.

A vector diagram is shown in FIGURE 3 for the velocities at the points 34 and 35 when the maximum velocity flow tube MF intersects inner and outer envelopes 6, 7 of the blades 3. In the diagram $V_{P1}$ is the peripheral velocity of the inner edge of the blade 3 at the point 34, $V_{A1}$ the absolute velocity of the air in the flow of tube MF at the point 34, and $V_{R1}$ the velocity of that air relative to the blade as found by completing the triangle. The direction of the vector $V_{R1}$ coincides with that of the blade at its inner edge and fluid enters the blade without shock. Similarly, $V_{P2}$, $V_{A2}$ and $V_{R2}$ respectively represent the peripheral velocity, the absolute velocity of the air, and the velocity of the air relative to the blade, at the point 35 on the outer edge of blade 3. It is considered that the blade angles and blade curvature determine the character of the vortex, while the position of the vortex core is determined by means of the guide body 9 and more particularly by the main guide wall portion 11 thereof. It is considered that in a given case the particular blade angles and blade curvature depend on the following parameters among others: the diameter of the blades, the depth of a blade in radial direction, the density and viscosity of the fluid, the disposition of the external guide body and the rotational speed of the rotor, as well as on the ratio between overall pressure and back pressure. These parameters must be adapted to correspond to the operating conditions ruling in a given case. In order to get optimum results in a given case quite definite blade angles and shape have to be adopted.

It is to be appreciated that while FIGURE 1 shows what will commonly be found the most practical and efficient form of guide body, many variations can be made in its form while still preserving the preferred vortex flow which has been described. Thus, the guide body may simply be a rounded nose, or may define a parallel gap with the rotor: passages may be formed in the guide body to convey a portion of the flow on the pressure side so as to improve the vortex formation. Though it will normally be preferred to have the guide body well spaced from the rotor, even this is not always necessary.

FIGURE 1 does not show the manner in which the blades 3 are supported, but it will be understood that in a simple construction these may be held between end discs carrying stub shafts journaled in fixed bearings. It is preferred to have the interior completely unobstructed, as shown in FIGURE 1, but it may sometimes be desirable (as shown later) to run a supporting shaft through the rotor: provided the shaft diameter is not excessive, satisfactory operation is still obtained. The rotor blades 3 may be skewed if desired; this assists torque transmission by the blades since the forces set up by the torque have components longitudinally of the skewed blades and do not have to be transmitted by shear only.

Figure 4:
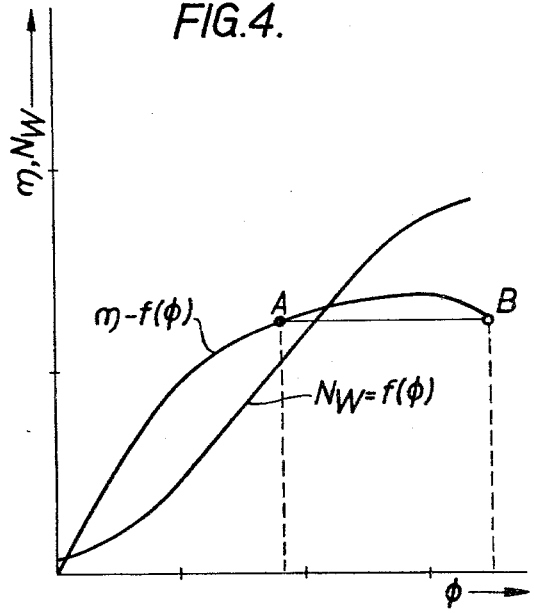
FIGURE 4 is a graph illustrating the performance of the FIGURE 1 blower and in which shaft power N$w$ and efficiency $\eta$ are plotted as ordinates against throughput $\phi$.

In FIGURE 4 $\eta$ and $N_W$ are represented as ordinates and $\phi$ as abscissae. These symbols are defined as follows:

$$\eta = \frac{\text{energy added to the throughput}}{\text{shaft power taken by blower}}$$

$N_W$ = shaft power taken by blower $$\phi = \frac{\text{throughput per unit time}}{\text{effective surface of rotor} \times \text{peripheral speed of rotor}}$$

(As will be understood, $\eta$ is efficiency and $\phi$ is a dimensionless number representative of the throughput per unit time.)

The $\eta/\phi$ and $N_W/\phi$ curves shown in FIGURE 4 relate to the blower as described with reference to FIGURES 1 to 3.

The first main point of interest is that as throughput is throttled to zero, so the power taken diminishes to nearly zero: this contrasts with axial flow blowers where throttling does not substantially reduce, and may even increase, the power taken.

The second main point of interest is the flat top of the $\eta/\phi$ curve showing a wide working range between the points A, B.

The degree of throttling in a blower as shown in FIGURES 1 to 3 can readily be varied by modification of the vortex. For this purpose the core region V can be displaced: alternatively, or in addition, it can be expanded as by adjustment of the shape and/or position of the guide member 9. Throttling can be modified by moving the guide wall 10 towards or away from the guide body 9, for which purpose it may be pivoted adjacent its line 10a of nearest approach to the rotor: in FIGURE 1 there is shown in chain lines 10x a position of the guide wall 10 in which it is pivoted towards the body 9 to partially throttle the blower. Alternatively, provision may be made for closing off the air intake to the rotor.

By varying the throttling the blower can be adapted to the variation of the coefficient $\eta$ which diminishes with increasing altitude, without any change in the speed of the blower.

The efficiency of the above described blower is lower than that of large airscrews, and is approximately equal to that of small airscrews. The reason for this is that the correlation of the vectors described by reference to FIGURE 3 with the flow lines of the vortex field can be an optimum only within a narrow entry and exit region and although this accounts for the major part of the flow it does not account for all of it.

Attention is particularly drawn to the fact that in the blower described the velocity of the outflowing air is much greater than the peripheral velocity of the blades, due to the effect of the vortex. The blower is thus, to be distinguished from blowers where the blades act simply as paddle wheels and induce a flow which cannot have a velocity greater than the peripheral blade velocity.

Attention is also directed to the simplicity of the mechanical parts of the blower, and particularly to the fact that generous spacing is recommended at the lines of nearest approach of the guide means, on both sides of the rotor. Manufacture of the blower does not, therefore, involve the sort of design problems and expense which are associated with close tolerances. Moreover, the blower is able without excessive rigidity of its parts to accommodate minor relative movement thereof, due to stressing of the aircraft, vibration or even minor damage: since the blower is, therefore, not unduly delicate it may safely be used on aircraft.

The rotor of the above-described blower can, of course, in principle be of any desired length. However, the spacing mentioned facilitates the design of a long rotor.

FIGURES 5, 6 and 6a illustrate an aircraft incorporating a combined propulsion and flap system according to the invention. The aircraft has a fuselage 51 and tail plane 52 of conventional form and a pair of wings 53 which are also conventional in form and disposition with the exception of their trailing edge portions. A rotor comprising four rotor sections 54, 55, 56, 57 aligned on a common axis is mounted within the trailing edge portions of each wing 53 and extends longitudinally of the wing over substantially its whole length. Each rotor section 54, 55, 56, 57 comprises a series of blades 58 interconnected by means of end discs 59 and intermediate discs 60 spaced along its length, the blades being shaped and arranged as described with reference to FIGURE 1. The rotor sections 54, 55, 56, 57 of each wing 53 are driven by a common single internal combustion piston engine 62 of the air-cooled radial type set centrally within the fuselage 51 behind a passenger compartment 63 therein and having its shaft 64 transverse to the fuselage and aligned with the common axis of the rotor sections: cooling air for the engine may be ducted thereto from the sides of the fuselage and discharged radially thereover to be received in a volute 62a having a rearwardly directed outlet 62b at the top of the fuselage—in this way the cooling air can be induced to make a contribution to the forward thrust on the aircraft. The engine shaft 64 is coupled to the inner rotor sections 57 through an intermediate shafting 65 and a pair of universal joints 66. Each rotor section is coupled to the next by a universal joint structure 67 deriving support from a bulkhead or transverse partition 67a and the extreme ends of the rotor are similarly supported by a felt-aligning bearing designated 67b. Each rotor section is thus supported from the wing structure at either end in such a way as, with the universal joints 66 and 67, to permit the usual flexing of the wing in service as shown, somewhat exaggerated, in FIGURE 7. The scale of the figures does not permit more than an indication of the position of the various universal joints; however a full description of supporting and universal joint structures is given with reference to later figures and it will readily be understood that such structures can be incorporated in the aircraft of FIGURES 5 and 6.

A flap 68 is mounted at the trailing edge of each wing 53 for pivotal movement under the control of the pilot about an axis 68a extending longitudinally of the wing: the flap extends over the whole length of the rotor sections 54, 55, 56, 57. The lower surface 69 of the flap 68 forms (in the flap-up position shown in FIGURE 6) a continuation of the lower surface 70 of the wing 53, while the upper surface 71 of the flap defines with the trailing edge termination 72 of the upper wing surface 73 a long slot-like discharge opening 74 extending the whole length of the flap and rotor sections. A portion of the upper surface 73 of the wing 53 above and forward of the rotor sections 54, 55, 56, 57 and extending the whole length thereof is formed with longitudinal slits 75 diverging in the direction of flow and providing inlets of diffusing character for flow to the rotor sections. A guide structure 76 within the wing 53 provides a main guide wall 77 and an outlet wall portion 78 leading therefrom towards the discharge opening 74 and fairing into the upper surface 71 of the flap 68. A guide wall 79 depending from the upper surface 73 of the wing 53 extends from adjacent the rotor to the rearward termination 72 of that surface and defines with the guide wall portion 78 a convergent outlet passageway 80 leading from the rotor to the discharge opening.

It will be seen that the rotor section 54, main guide wall 77, outlet wall portion 78 and guide wall 79 correspond to the rotor 1, wall portions 11, 12, and 10 respectively of FIGURE 1, and it is to be understood that they co-operate in a generally similar manner to induce a flow of air from the inlet slits 75, through the rotor sections and out through the outlet passageway 80 to the opening 74, whence the air is discharged rearwardly over the upper surface 71 of the flap and produces the forward thrust required for the propulsion of the aircraft. It is particularly to be noted that flow conditions are substantially similar over the whole length of the rotor sections 54, 55, 56, 57 and that flow takes place in vertical planes perpendicular to the axes thereof. The location of the inlet slits 75 provides for a degree of boundary layer control on the upper surface 73 of the wing 53 while their diffusing character gives rise to a pressure increase which improve the mass throughput of the rotor sections 54, 55, 56, 57. The convergence of the outlet passageway 80 in the normal position of the flap 68 provides a nozzle effect increasing the speed of the discharged air: the trailing edge portion of the upper wing surface 73 and the guide wall 79 can if desired be made pivotable so as to provide for regulation of the speed of air discharged independently of rotor speed. Air discharged through the opening 74 flows over the upper surface 71 of the flap 68 and the direction of discharge is governed by the setting of the flap. Improved control by the flap 68 is obtained due to the air discharged over it: the arrangement provides in effect a combined flap and jet flap. Lowering of the flap 68 produces an increase in the available lift, since the thrust due to the air discharged over the surface 71 then has an upward component.

If it is desired to make substantial use of the lift which a wing structure according to the invention can provide, for example in the design of short take-off and land aircraft, it will normally be desirable to provide some means to take account of the movement of the centre of pressure which will occur to a greater or lesser extent. One way of so doing is to shift the leading part of the wing forward when the flap is lowered. A construction operating on this principle will now be described with reference to FIGURES 8, 9, 10a, and 10b. Various other ways compensating for movement of the centre of pressure will then be described in relation to later figures.

FIGURE 8 shows a wing structure designated generally 85 having a main or forward part 86 which is of conventional exterior form and includes front and rear spars 87, 88, and a flap structure 89 including main and auxiliary flaps 90, 91. The main wing part 86 and flap structure 89 define between them a slot 92 wherein is situated a hollow bladed cylindrical rotor 93 mounted for rotation about its axis, indicated at 94, which extends lengthwise of the wing: the flap structure is angularly movable about the rotor axis under control of the pilot between the flap-up position illustrated and a lowered position where it extends generally downwards. In the flap-up position the lower surface 95 of the main flap 90 forms as it were an extension of the lower surface 96 of the main wing part 86, and the upper surface 97 of the auxiliary flap 91 conforms to the curve of the upper surface 98 of the main wing part. The lower surface 99 of the auxiliary flap 91 defines with the upper surface 100 of the main flap 90 a convergent passageway 101, and the latter surface rounds into a main guide surface 102 opposite the rotor 93: this guide surface in turn merges, at its line of nearest approach to the rotor, with a lead-in surface 103 fairing with the lower flap surface 95.

It is to be understood that the rotor 93 is similar to the rotor 1 of FIGURE 1, and that the guide surfaces 99, 102, 100 for the rotor 93 correspond respectively with the guide surfaces 10, 11, 12 of FIGURE 1: the rotor 93 and guide surfaces 99, 102, 100 co-operate as described with in relation to FIGURE 1, and for further explanation of their construction and function reference should be made to that figure and the corresponding description. It will be seen that, in whatever position of the flap structure 89, the rotor 93 operates to discharge air directly through the outlet passageway 101 over the upper surface 100 of the main flap 90, with the direction of discharge determined by the setting of the flap.

Various similarities between the wing structures of FIGURES 6 and 8 will be apparent: however it is contemplated that the flap structure of FIGURE 8 will have a greater angle of movement. In addition, it will be seen that the rotor 93 receives its air, or most of it, from below and not through the upper surface of the wing.

The main and rear spars 87, 88 have secured thereto longitudinally extending tubes 105, 106. The main spar 87 and the tube 105 extend through the aircraft fuselage, schematically indicated at 107, and are continuous with the corresponding parts of the wing structure on the opposite side of the fuselage. The rear spar 88 and tube 106 of each wing project into the fuselage 107, but are not continuous with the corresponding parts of the opposite wing. A stout tube 108 extends transversely of the fuselage 107 between the sides thereof, which are suitably reinforced; a pair of arms 109 are journalled on this tube 108 and articular to the tube 105. A second pair of arms 110 journalled on stubs 111 projecting inwardly from the fuselage 107 carry the tube 106. Under the influence of hydraulic piston and cylinder mechanisms controllable by the pilot and designated generally 112, the arms 109 and 110 can be moved angularly, whereby to shift the main part 86 of the wing structure between the rearward position thereof shown in full lines in FIGURE 8 and the forward position shown chain-dotted, at 86a.

FIGURE 10a shows the outline of the wing structure 85 in its flap-up condition and the corresponding pressure diagram, with pressure shown as ordinates and the wing chord forming abscissa. FIGURE 10b shows the outline of the wing structure 85 in flap-down condition, with the corresponding pressure diagram. The normal flight condition of the wing structure is that of FIGURE 10a where the air leaving the rotor 93 gives rise only to horizontal thrust, the centre of pressure is shown at $P_1$. The FIGURE 10b condition of the wing structure is adopted for take-off and landing. Because the flap structure 89 is lowered, air leaving the rotor gives rise to substantial amount of lift; flow of air against the flap gives rise to additional lift. Total lift in the region of the flap structure is represented by the hump 113 appearing in the pressure diagram, which has the natural tendency of bringing the centre of pressure, indicated at $P_2$, aft. To counteract this the hydraulic mechanisms 112 are actuated to move the main wing part 86, with the result that the peak 114 in the pressure diagram at the leading edge side thereof is brought forward.

In the event of failure of engine power, the construction is such that the main wing part 86 returns to its FIGURE 10a position without the intervention of hydraulic power since this may fail with the engine.

FIGURE 8a illustrates a modification of the structure illustrated in FIGURE 8: similar parts are given the same reference numerals and will not need further description. The essential difference between the two figures is that in FIGURE 8a the main flap, these designated 90', is truncated, and terminates opposite the auxiliary flap 91 so that the guide surface of the main flap determining the direction of discharge is an internal surface 100' and not a surface affected by, or with any effect on, the air flow over the wing structure due to forward movement of the aircraft. Functioning of the FIGURE 8a modification is similar to that of FIGURE 8, though it will be appreciated that the effect of the flap 90' as such upon air flow over the wing structure is reduced.

FIGURES 11 and 12 illustrate a further form of aircraft wing designated 120 and supported on an aircraft illustrated partially and schematically and designated 120a. A cylindrical bladed rotor 121 is rotatably mounted within a chamber 121a formed in the trailing edge portion of the wing by a reverse S-shaped partition wall 122 extending between the upper and lower surfaces 123, 124 of the wing. A guide wall structure 125 projects toward the rotor 121 from the trailing edge portion of the upper wing surface and provides a main guide wall 126 facing the rear side of the rotor and an outlet wall 127 leading rearwardly therefrom. The rotor 121 is generally similar to the rotor 1 of FIGURE 1, while the main guide wall 126 and outlet wall 127 correspond to the walls 11 and 12 in FIGURE 1. The partition wall 122 where it fairs into the lower wing surface 124 is formed to provide a guide wall corresponding to that designated 10 in FIGURE 1 and co-operates with the outlet wall 127 to direct horizontally rearwardly air which leaves the rotor. The rotor 121 and surrounding guide walls co-operate as described with reference to FIGURE 1 and will not require further description. The upper surface 123 of the wing 120 between the partition wall 122 and the guide wall structure 125 is formed with longitudinal inlet slits 128 diverging in the direction of flow. A flap 129 of symmetrical airfoil shape is mounted for angular movement about a longitudinal pivot axis 130 at the trailing edge of the wing.

As so far described, it will be seen that on rotation of the rotor 121 air is drawn into the chamber 121a through the inlet slits 128 from the upper side of the wing 120; this air twice traverses the path of the rotating rotor blades and is ejected horizontally rearwardly towards the flap 129. When the flap is horizontal or inclined at only a small angle thereto, as illustrated in FIGURE 11, the air flows over both surfaces of the flap 129 and discharges at the angle at which the flap is set. When the flap 129 is set approximately vertically, as in FIGURE 12, most of the air leaving the rotor 121 is diverted by the flap to flow vertically downward and thereby produce a substantial lift component.

A portion 131 of the wing at the leading edge is pivotally mounted about an axis 132 at the lower surface 124 of the wing, so that in what will be termed the closed position of the leading edge portion, illustrated in FIGURE 11, the upper and lower surfaces 133, 134 thereof fair with the upper and lower surfaces 123, 124 of the rest of the wing, while when the leading edge portion is pivoted down by some 30° to what will be termed its open position, an opening 135 is defined in the wing between the upper surface 133 of the wing portion 131 and the upper surface 123 of the remainder of the wing. An auxiliary cylindrical bladed rotor 136 is rotatably mounted within the leading edge wing portion 131 upon brackets 137 which interconnect upper and lower surfaces of such portion. The brackets 137 have rearward extensions 138 carrying a guide body 139, while a guide wall 140 is fixed to the underside of the upper surface 133 of the leading edge wing portion 131. A hydraulic piston and cylinder mechanism designated 141 is mounted on the main spar 142 of the wing to move the leading edge wing portion 131 between open and closed positions, under the control of the pilot. In the open position of the leading edge wing portion 131 the guide body 139 is brought by the pivotal movement of the brackets 137 and extensions 138 into a position where it forms a nose projecting towards the rotor 136 from the front edge of the upper wing surface 123. In this position, when the rotor 136 rotates, it co-operates with the guide body 139 and guide wall 140 in the manner described with reference to FIGURES 1 to 3 to induce a flow from the interior of the wing out through the opening 135: the guide body and guide wall are shaped to direct this flow rearwardly over the upper surface 123 of the main portion of the wing. To allow air to enter the interior of the wing, a flap 143 in the lower surface 124 thereof is made to open inwardly (by means not shown) simultaneously with the lowering of the leading edge wing portion 131: it will be appreciated that the main spar 142 is pierced with lightening holes at intervals for free air flow to the auxiliary rotor 136.

Operation of the aircraft fitted with the wing 120 will best be understood from a consideration of FIGURES 13a and 13b illustrating the wing configurations and pressure diagrams of normal flight, and take-off/landing, respectively, with the same conventions as used in FIGURES 10a and 10b. In normal flight the leading edge wing portion 131 and the flap 143 are in closed position, only rotor 121 operates, and the flap 129 is at small angle to the horizontal which angle may be adjusted by the pilot as required to control flight. Air leaving the rotor 121 produces substantially only thrust, and the pressure diagram is that of a conventional wing, showing a centre of pressure $P_1$. On take-off or landing the flap 129 is pivoted to produce a substantial lift while the leading edge wing portion is lowered to the open position, the flap 143 is opened, and the rotor 136 is brought into operation. The increased lift adjacent the trailing edge of the wing is shown at 144: increased lift is also provided at the leading edge of the wing due to its changed shape and the discharge of air over the upper wing surface 123 through the opening 136, due to the operation of the rotor 131. As a result, the position of the centre of pressure (which in the FIGURE 13b configuration is shown at $P_2$) does not alter.

It is once again to be emphasized in the wing structure of FIGURES 11 and 12 that, though not shown in the drawings, the main rotor 121 extends over a major part of the length of the wing and discharges directly rearwardly towards the flap 129 which extends opposite the rotor over its whole length. The auxiliary rotor 136 also extends over the whole length of the main rotor, opposite it.

Referring now to FIGURES 14 and 16, there is shown an aircraft with conventional fuselage 145 and trail plane structure 146, and with wings 147 extending to either side of the fuselage. Each wing 147 includes a forward and a main spar 148, 149 and carries a flap 150 extending along its trailing edge and pivotally mounted about a longitudinal axis 150a. A pair of rotors 151, 152, one forward and somewhat below the other extend longitudinally of each wing 147 in the compartment 147a thereof between the main spar 149 and the flap 150 and are driven by separate engines 153, 154 situated in the fuselage, each motor driving one rotor of each wing. The wings are sub-divided into sections 151a, 151b, 151c, etc. and 152a, 152b, 152c etc. as described with reference to FIGURES 5 to 7, each section being supported at its ends by transverse bulkheads 155 (FIGURE 16) by means which permit slight angular movement of the rotor section axes on flexure of the wing and which also provide for the transmission of drive between these sections. As previously mentioned, arrangements for providing support and drive to the rotors are discussed in relation to later figures to which reference should be made, and for this reason these arrangements are illustrated only summarily in FIGURES 14 to 16.

A portion of the upper wing surface 156 defining the rotor compartment 147a is provided with longitudinal inlet slits 157 extending the length of the rotors 151, 152 and diverging in the direction of flow. An intermediate guide structure 158 extends longitudinally of the compartment 147a part way between the upper wing surface 156 and the lower wing surface 159, and terminates about opposite the flap pivot axis 150a. Upper and lower guide structures 160, 161 project towards rotors 152 and 151 respectively from the upper and lower wing surfaces 156, 159, and, with the intermediate guide structure 158, extend over the length of the rotors. The lower and intermediate guide structures 161, 158, together with the interior of the lower wing surface 159 provide for the lower rotor 151 a main guide surface 162 and outlet walls 163, 164 defining an outlet passageway 165 discharging at a slight upward angle below the pivot axis 150a of the flap 150. The upper and intermediate guide structures 160, 158 provide for the upper rotor 152 a main guide surface 166 and outlet walls 167, 168 which define an outlet passageway 169 discharging horizontally above the flap-pivot axis 150a. Once again, the rotors 151, 152 with their respective guide walls 163, 167 main guide surfaces 162, 166, and outlet walls, 164 168, are designed to co-operate as described with reference to FIGURES 1 to 3.

In operation, with the flap 150 set approximately horizontal as shown in full lines in FIGURE 14, as will be the normal flight position of the flap, rotation of the rotors 151, 152 induces a flow of air through the inlet slits 157, twice through the path of the rotating blades of one or other rotor, and out through the outlet passageways 165, 169 whence the air is discharged directly rearwardly over upper and lower surfaces of the flap 150. As in other embodiments described, the flow lines extend in vertical planes transverse to the wing, and flow conditions are generally similar at all points along the length of the flap. The rearward flow of air from the outlet passageways 165, 169 generates the forward thrust for the aircraft. Control of the aircraft in flight is effected by slight pivoting of the flap 150, the air flow over the flap following the inclination thereof. For take-off and landing a somewhat greater inclination of the flap 150 is adopted, as shown in chain-dotted outline in FIGURE 14, so that a substantial vertical component of thrust is obtained. However this embodiment of the invention is not intended to produce such a high proportion of lift to horizontal thrust as with, say, the embodiment of FIGURES 11 and 12, since no provision is made for compensating for the increased lift at the trailing edge of the wing profile, apart from the normal control surfaces of the trail plane structure 146.

It will be appreciated that, as with certain previous embodiments, air sucked into the rotor compartment 147a in operation effects a partial removal of the boundary layer on the upper wing surface 156 and thereby improves the lift thereof. The divergence of the inlet slits 157 produces an increased pressure within the compartment 147a and improves the mass throughput.

Returning now to FIGURE 16, the engines 153, 154 there shown are of the high speed light-weight 2-stroke gasoline type and have their cylinders in line. The engines 153, 154 are fixed in the fuselage 145 with their crankshafts (not shown) parallel and disposed across the fuselage centre line. The engine 153 has each end of its crankshaft connected to provide direct drive to the rotors 151 on either side of the fuselage 145. Similarly, the engine 154 has its crankshaft connected for direct drive of the rotors 152 on either side of the fuselage. Thus failure of one engine still leaves a symmetrical propulsion system operating.

The engines 153, 154 are both air cooled. Each has a cylindrical bladed drum rotor 170 mounted for rotation about an axis parallel to that of the engine crankshaft and driven therefrom by belting (not shown). Each rotor 170 is disposed alongside the bank of cylinders and co-operates with guide walls (not shown) in the general manner described with reference to FIGURE 1 whereby in operation to direct a stream of cooling air against the cylinders over the whole length of the bank. The air for the engine-cooling rotors 170 is taken from slits 171 disposed in the fuselage to the rear of the passenger cabin (not shown), through ducting. Only the ducting 172 for one rotor 170 is shown in FIGURE 18, and it will be seen that this communicates with only half the slits 171; the remaining slits are connected to the other rotor 170 by ducting not shown. Cooling air is ejected from both rotors to slits 173 disposed where the fuselage 145 begins to taper: once again only the ducting 174 for one rotor 170 is shown and it will be understood that the other such rotor is similarly provided. The slits 173 are arranged for ejection of air over the tapering part of the fuselage 145 whereby again to provide boundary layer control in a region where flow difficulties are commonly encountered. The air flow through the slits 171, 173 accordingly reduces drag on the aircraft.

The wing of FIGURES 17 and 18 includes a fixed rear section 180, and leading and intermediate wing members 181, 182 adapted for movement as will be described. The rear wing section 180 has an upper surface 183 formed with longitudinal inlet slits 184 diverging in the direction of flow, and contains two cylindrical bladed rotors 185, 186 rotatably mounted about longitudinal axes, one in front of the other, which in operation receive air from the inlet slits and discharge it through rearwardly directed outlets 187, 188 in the lower part of the wing section. Flaps 190, 191 of airfoil section are provided one adjacent each outlet 187, 188, and carried on arms 192, 193 positioned out of the air flow and pivotally mounted at 193, 194 whereby the flaps are movable between a retracted position, shown in FIGURE 17, where they fair with the under surfaces of the rear wing section, and an extended position, shown in FIGURE 18, where they are positioned opposite their respective outlets so as to deflect air flow therefrom in a downward direction.

An arcuate front wall 195 of the rear wing section 180 provides a guide wall for the leading rotor 185, while an intermediate guide structure 196 extending lengthwise of the wing section provides a main guide surface 197 facing the rotor. Similarly, the intermediate guide structure 196 provides a guide wall 198 for the rotor 186, while a trailing edge portion 199 of the wing section 180 provides a main guide surface 200 therefor. The flaps 190, 191 retract respectively into recesses 201, 202 in the intermediate guide structure 196 and trailing edge wing portion 199 and their lower surfaces fair into the adjacent surfaces of this guide structure and wing portion to form outlet walls 203, 204 for the rotors 185, 186, the outlets 187, 188 being defined by these outlet walls and the guide walls 195, 198 in the retracted condition of the flaps. With the flaps 190, 191 extended, it is the surfaces of the recesses 201, 202 which form outlet walls for the rotors 185, 186 and with the guide walls 195, 198, define the outlets 187, 188. The rotors 185, 186 with their respective guide walls 195, 198, main guide surfaces 197, 200 and outlet walls are designed to co-operate as described with reference to FIGURES 1 to 3 and will not therefore require further description here. It is to be understood that the recesses 201, 202 assist the downward deflection of the air by the flaps 190, 191 when the latter adopt their extended position, while with the flaps retracted the outlet walls 203, 204 then formed correspond more with the wall 12 of FIGURE 1 and flow is directed rearwardly over these walls.

The rotors 185, 186 are preferably driven by separate engines in the manner described with reference to FIGURE 16.

The leading movable wing member 181 provides upper and lower wing surfaces corresponding to the leading half of a conventional wing. The intermediate movable wing member 182 provides an upper surface similar to that of the middle part of a conventional wing. The leading wing member 181 is supported on a linkage comprising two equal arms 205 articulated to said member at 206 and rotatable about pivots which are designated generally 207 and fixed with respect to the fuselage shown schematically at 180a: the linkage and its supporting structure will be described further below. The intermediate wing member 182 is supported on the leading wing member 181 and movable relative thereto on a roller track indicated generally 208 in FIGURE 18, and operating in a manner known in the art in connection with the operating mechanisms of Fowler flaps.

Referring to FIGURES 19a, 19b in conjunction with FIGURES 17 and 18 it will be seen that the fuselage designated generally 180a includes a stout casting 222 of light alloy arranged at each side, the casting carrying the weight of the wing members 181, 182 and rear wing section 180 and distributing this weight to the stressed skin 223 and other structural parts (not shown) of the fuselage. The castings 222 provide opposed pairs of bearings 224, each pair rotatably mounting between them a shaft 225 extending across the fuselage 180a providing the previously mentioned pivot 207 for the linkage arms 205 supporting the wing member 181. The arms 205 for the wing member 181 on each side of the fuselage terminate at one end in enlargements 205a received upon the shaft 225 near the corresponding bearing 224 and pinned to the shaft by pins 226. The other ends of the arms 205 are also enlarged and provide bearings 227 in which are journalled large-diameter torque tubes 228, 229 forming the main structural members of both wing members 181. Each torque tube 228, 229 extends the whole length of both wing members 181 and through the fuselage 180a, arcuate slots 230 being formed in the fuselage skin 223 to accommodate the torque tubes during movement of the wing members between the positions of FIGURE 17 and FIGURE 18. The wing members 181 are thus cantilevered off the fuselage 180a through the arms 205 and move in unison upon application of torque to the shaft 225 by means not shown, for example hydraulic rams of conventional type. A flat arcuate plate 231 moving with the torque tubes 228, 229 slides over each of the slots 230 as they move and closes it.

The leading wing members 181 each include upper and lower walls 232, 233 pivoting wing surfaces, and between them in the interior of the member an intermediate housing portion 234 to receive the intermediate wing member 182 and the track 208 therefor. A spar 235 extending the length of the member 181 (but not, of course, through the fuselage to the other member 181) connects the housing 234 to the lower wall 233 to rigidify the structure. The rear of the wing member 211 between the housing 234 and lower wall 233 is closed by a wall 236 which overlies the front wall 195 of the rear wing section 180 in the FIGURE 17 position of the wing parts to provide a fair entry of air to the rotor 185 through the opening 237 in the upper wing surface between the rear of the leading member 181 and the rear wing section 180.

In the normal flight position of the wing members 181, 182 and the rear wing section 180, as shown in FIGURE 17, the intermediate member 182 lies within the member 181, and the latter co-operates with the rear wing section to present a section generally similar to that of a conventional wing.

For landing or take-off the flaps 190, 191 are extended, the leading wing member 181 is moved forwardly and upwardly on the linkage arms 205, and the intermediate wing member 182 is moved rearwardly on its track 208 to fill the space between the leading member and the rear wing section, the upper surfaces of the leading member, intermediate member and rear section then co-operating to present an upper wing surface of conventional form, as illustrated in FIGURE 18.

In normal flight, the rearward discharge of air from the outlets 187, 188 sets up a forward thrust on the aircraft which suffices for its propulsion, while lift is provided by the wings in the usual way; the lift diagram is shown in FIGURE 20a and the centre of pressure at $P_1$ therein. In the take-off/landing position of FIGURE 18 the downward deflection of the air leaving the outlets 187, 188 sets up a strong vertical thrust component, represented on the lift diagram of FIGURE 20b as a hump near the trailing edge of the wing. However, in this wing position the chord is extended, so that the hump associated with the leading edge comes further forward and the centre of pressure, indicated at $P_2$, lies in the same position, relative to the fuselage, as the centre of pressure $P_1$ for normal flight.

The wing structure of FIGURES 17 to 19b will be seen to have in common with that of FIGURES 8 and 9 the forward movement of the leading edge of the wing bring forward the lift associated with the leading edge and thereby balance the increased lift at the trailing edge of the wing in the flap-down condition, so as to maintain the centre of pressure in vertical alignment with the centre of gravity. Of course, some compensation for the effect of the increased lift can be obtained with the ordinary control surfaces of the aircraft, but where considerable lift is to be desired from the flap and blower combination it is preferred not to rely on these ordinary control surfaces alone.

FIGURE 21 shows a universal joint structure designated generally 300 connecting a drive shaft 301 to an end support disc 302 of a rotor section 303. The structure 300 may form the joint designated 66 in FIGURE 5 connecting the shaft 65 to the rotor section 57, or equivalent parts in other embodiments.

The joint structure 300 comprises a cup 304 which has a coned central hole 305 mating with a tapered portion 306 of the shaft 301, the cup being secured rigidly thereon by a lock-nut 307. The cup 304 is formed with interior arcuate splines 308 whose centre of curvature indicated at 309 is situated on the axis of the shaft 301.

A thick coupling disc 310 is secured rigidly to the rotor section end disc 302, which is centrally apertured at 311, by means of bolts 312. The periphery of the coupling disc 310 is formed over a segment of a sphere centered at 309 with teeth 313 which mate with the arcuate splines 308 on the cup 304, with minimum play. The sides of the teeth 313 are slightly chamfered towards their ends, as shown at 314 in FIGURES 23 and 24. The coupling disc 310 is centrally apertured with the walls 315 of the aperture forming a segment of a sphere centered on the point 309, and a part-spherical locating element 316 slidable on a reduced diameter cylindrical extenison 317 of the shaft 301 is received in the aperture of the coupling disc and mates with the walls 315 defining the aperture. A castellated retainer nut 318 received on a threaded end portion 319 of the shaft 301 holds the locating element 316 in position and takes up endwise play in the joint structure.

The joint structure 300 provides both support for, and drive to, the rotor section 303 in a manner which permits a limited degree of pivoting action of the axis of the rotor section relative to the axis of the shaft, about the point 309, by reason of the teeth 313 sliding in the splines 308, the locating element 316 sliding over the mating surface 315 of the coupling disc 310; the slight angular movement of the teeth on radial axes is permitted without loss of contact by the chamfers 314. By reason of the continuous contact of the teeth 313 and splines 308 the joint is completely rigid except for the permitted pivoting action whereby to minimize wear and vibration.

It will be understood that an undriven end of an extreme rotor section (as for example the left hand end, as illustrated, of the rotor section 54 in FIGURE 5) can be mounted in a self-aligning bearing of conventional type.

FIGURE 25 illustrates a joint structure 320 mounted on a rigid bulkhead or like member 321 and interconnecting the end support discs 322, 323 of adjacent rotor sections (not shown). The structure 320 may provide the joint illustrated at 67 in FIGURE 5 interconnecting the rotor sections 54 and 55, for example. The joint structure 320 is in essence two structures 320 back to back, and parts in FIGURE 25 which correspond in function with those of FIGURES 21 to 24 will be given the same reference numerals, distinguished by a prime, and will not require further detailed description.

The joint structure 320 comprises a mounting ring 324 fixed to the bulkhead or like member 321 and forming the outer race of a ball-bearing having a double row of balls 325 and an inner race provided by an annular member 326 providing two sets of interior arcuate splines 308' centered at the corresponding point 309'. Coupling pieces 304' are secured rigidly with the adjacent rotor end discs 322, 323 with the aid of distance pieces 327, and have teeth 313', formed as segments of spheres centered at the respective points 309' and chamfered as shown in FIGURES 23 and 24, engaging the arcuate splines. Part-spherical locating elements 316' engage in mating apertures in the end disc 310': one is formed as the head of a bolt 328 and the other is a sliding fit on the shank of the bolt and the two are held in desired spacing by a castellated nut 329 on the threaded end of the nut.

The arrangement described enables the axes of the rotor sections to pivot slightly, independently of one another about the respective points 309', while the sections are nevertheless supported on the fixed bulkhead 321 and connected for transmission of drive from one to the other.

It will be appreciated that a variety of modifications can be made in the embodiments of the invention described; thus certain features of one embodiment may be combined with certain features of another embodiment.

Among other possible modifications, it is contemplated that the motors driving the rotors, for example in FIGURES 14 to 16, may be located in the wings rather than in the fuselage.

It is also possible to make use of the gas-turbine drive arrangements contemplated in my copending application which is a continuation-in-part of application No. 148,287 itself a continuation-in-part of application No. 701,643, and bears case No. 6526.

I claim:

1. An aircraft wing structure having a main wing portion and a movable flap portion mounted on a rear part of said main wing portion, a cylindrical bladed rotor clear of interior guides rotatably mounted in the wing structure with its axis extending longitudinally thereof over the length of said main wing portion and said flap portion, guide means extending the length of said rotor and outside it and co-operating on rotation of the rotor to induce a flow of air transversely to the rotor axis through the path of the rotating blades into the interior of the rotor and thence again through the path of the rotating blades, the wing structure defining a slot-like discharge opening extending the length of said rotor whereby the throughput thereof is discharged over a surface of said flap portion.

2. An aircraft wing structure as claimed in claim 1, wherein said guide means includes a main guide surface of small angular extent with respect to the rotor axis and a guide wall opposite the main guide surface which diverges steadily from the rotor going in the direction of rotor rotation from a line of nearest approach thereto defining the arc of air entry to the rotor, both the main guide surface and said guide wall being spaced from the rotor by more than one third of the radial blade depth and said surface and wall co-operating with the rotor on rotation thereof to generate a vortex of Rankine type interpenetrating the rotor blades adjacent the guide surface and guiding said throughput along lines which are curved about the vortex core.

3. An aircraft having a fuselage and a pair of wing structures each according to claim 1 and extending to opposite sides of the fuselage and being divided by transverse members, drive means situated in the fuselage and drivingly connected to the inner ends of both rotors, each rotor being divided along its length into a plurality of sections, means supporting each rotor section at its ends and drivingly interconnecting the rotor sections, said last means including universal joint structures each transmitting drive between a pair of rotor sections with accommodation of limited universal movement and deriving support from the transverse members.

4. An aircraft having a fuselage and a pair of wing structures each according to claim 1 and extending to opposite sides of the fuselage, each wing structure including a pair of rotors, a pair of separate motors situated in the fuselage and each being drivingly connected to one rotor of each wing structure.

5. An aircraft wing structure having a main wing portion and a movable flap portion mounted as a rear part of said main wing portion, a cylindrical bladed rotor clear of interior guides rotatably mounted in the main wing portion with its axis extending longitudinally thereof, the upper surface of the main wing portion being formed with an inlet and the wing structure defining a slot-like discharge opening adjacent the flap portion, the inlet and discharge opening extending the length of the rotor, guide means extending the length of said rotor and outside it and co-operating on rotation of the rotor to induce a flow of air transversely of the rotor axis through the path of the rotating rotor blades into the interior of the rotor and thence again through the path of the rotating blades and directly through said discharge opening over a surface of the flap portion.

6. An aircraft wing structure according to claim 5, including a second rotor coextensive with the first and with said flap portion, said rotors receiving their throughput from said inlet and discharging it to opposite sides of the flap portion in the normal flight condition thereof.

7. An aircraft having a wing structure with a main wing portion and a movable portion mounted on a rear part of said main wing portion for movement between a normal flight condition and a take-off/landing condition, means for angularly moving said flap portion, a cylindrical bladed rotor clear of interior guides rotatably mounted in the wing structure with its axis extending longitudinally thereof over the length of said main wing portion and said flap portion, guide means extending the length of said rotor and outside it and co-operating on rotation of the rotor to induce a flow of air transversely to the rotor axis through the path of the rotating blades into the interior of the rotor and thence again through the path of the rotating blades, the wing structure defining a slot-like discharge opening extending the length of said rotor whereby the throughput thereof is discharged over a surface of said flap portion and being effective to produce horizontal thrust in said normal flight condition of the flap portion and to produce a lift component in said take-off/landing condition of the flap portion, said aircraft further including means to modify lift in the region of the leading edge of the wing structure when said flap portion is in its take-off/landing condition whereby to minimize shift of the centre of pressure due to said lift component.

8. An aircraft as claimed in claim 7, wherein said lift-modifying means comprises means to shift the main wing portion forward bodily relative to said flap portion.

9. An aircraft as claimed in claim 7, wherein said lift-modifying means comprises a leading edge part of the main wing portion which is mounted to pivot downwardly and disclose an opening in the upper wing surface, and means to blow air rearwardly through the opening over the upper wing surface.

10. An aircraft as claimed in claim 7, wherein said lift-increasing means comprises means to extend the main wing section forwardly.

11. An aircraft having a wing including a main portion and a flap pivotally mounted at the trailing edge of said fixed portion, said wing having a part adjacent a surface of said flap defining therewith a generally rearwardly-directed longitudinal slit-like outlet opening, and, within the profile of the wing, a cylindrical rotor extending longitudinally thereof over the length of the slit-like outlet opening, the rotor having a series of concave blades extending generally longitudinally in a ring about the rotor axis to define an unobstructed interior space, and guide means located adjacent to said slit-like outlet opening, extending the length of the rotor in spaced relation therewith and co-operating therewith on rotor rotation to induce a flow of air from one side of the rotor through the path of the rotating blades to said interior space and thence again through the path of the rotating blades and to said slit-like outlet opening, the rotor discharging through said opening over said adjacent flap surface.

References Cited by the Examiner
UNITED STATES PATENTS
3,018,982   1/62   Multhopp _____ 244—15

FERGUS S. MIDDLETON, *Primary Examiner.*

MILTON BUCHLER, *Examiner.*